US007606587B2

(12) United States Patent
Xu et al.

(10) Patent No.: US 7,606,587 B2
(45) Date of Patent: Oct. 20, 2009

(54) MULTICAST TRANSMISSION IN A CELLULAR NETWORK

(75) Inventors: Lin Xu, Lempäälä (FI); Juha-Pekka Luoma, Tampere (FI); Sinikka Sarkkinen, Kangasala (FI); Rod Walsh, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/528,403

(22) PCT Filed: Sep. 20, 2002

(86) PCT No.: PCT/FI02/00753

§ 371 (c)(1),
(2), (4) Date: Mar. 18, 2005

(87) PCT Pub. No.: WO2004/028179

PCT Pub. Date: Apr. 1, 2004

(65) Prior Publication Data

US 2006/0166653 A1 Jul. 27, 2006

(51) Int. Cl.
*H04B 7/00* (2006.01)
*H04M 1/663* (2006.01)

(52) U.S. Cl. .................. 455/502; 455/412.2; 455/414.1
(58) Field of Classification Search ................ 455/3.02, 455/422.1, 502, 412.2, 414.1, 500; 370/312, 370/432
See application file for complete search history.

(56) References Cited

U.S. PATENT DOCUMENTS

| | | | | |
|---|---|---|---|---|
| 5,590,133 A | * | 12/1996 | Billstrom et al. | ............ 370/349 |
| 6,104,929 A | * | 8/2000 | Josse et al. | .................. 455/445 |
| 6,360,076 B1 | * | 3/2002 | Segura et al. | ............ 455/67.11 |
| 6,374,112 B1 | * | 4/2002 | Widegren et al. | ........ 455/452.2 |
| 6,466,552 B1 | * | 10/2002 | Haumont | ..................... 370/310 |

(Continued)

FOREIGN PATENT DOCUMENTS

EP 1392075 A1 * 2/2004

OTHER PUBLICATIONS

3GPP TR 23.846 1.2.0., 3$^{rd}$ Generation Partnership Project; Technical Specification Group Service and System Aspects; Multimedia Broadcast/Multicast Service; Architecture and Functional Description (Release 6), Sep. 2002.

(Continued)

*Primary Examiner*—Quochien B Vuong
(74) *Attorney, Agent, or Firm*—Squire, Sanders & Dempsey, LLP (57) ABSTRACT

The invention relates to a mechanism for performing multicast transmission in a cellular network. In order to enable establishment of resources only in cells containing members of the multicast group and to avoid congestion on the uplink channel, a multicast service notification is transmitted to mobile stations, thereby informing members of the multicast group of an upcoming multicast session. The moment for a response to said multicast service notification is selected in the mobile stations and a presence report is sent from at least one of said mobile stations at the response moment of said at least one mobile station. The presence report or reports are received within a radio access network, and radio resources are established for multicast transmission in a cell of the cellular network when the presence report(s) received in said cell meet(s) predetermined criteria.

34 Claims, 3 Drawing Sheets

U.S. PATENT DOCUMENTS

| | | | |
|---|---|---|---|
| 6,529,490 B1 * | 3/2003 | Oh et al. | 370/331 |
| 6,556,835 B1 * | 4/2003 | Raivisto | 455/466 |
| 6,636,491 B1 * | 10/2003 | Kari et al. | 370/328 |
| 2002/0106985 A1 * | 8/2002 | Sato et al. | 455/3.01 |
| 2003/0022683 A1 * | 1/2003 | Beckmann et al. | 455/518 |
| 2003/0211860 A1 * | 11/2003 | Sarkkinen et al. | 455/522 |

OTHER PUBLICATIONS

Lee et al, "A Performance Comparison Study of Ad Hoc Wireless Multicast Protocols," INFOCOM 2000. Nineteenth Annual Joint Conference of the IEEE Computer and Communications Societies. Proceedings. IEEE, 2000, vol. 2, pp. 565-574.

* cited by examiner

MULTICAST TRANSMISSION IN A CELLULAR NETWORK

FIELD OF THE INVENTION

The invention relates generally to a multicast service in a telecommunications system. More specifically, the invention relates to a method and a system for performing multicast transmission in a cellular network, and to a mobile station for a cellular network.

BACKGROUND OF THE INVENTION

In the present-day telecommunication environments, so-called point-to-multipoint services, which allow data to be transmitted from a single source point to multiple endpoints, are commonly known. In addition to the fixed networks, these services are expected to be used extensively in mobile and wireless networks.

This has been attended to in the standardization work of the 3rd Generation Partnership Project (3GPP) by defining a service called the Multimedia Broadcast/Multicast Service (MBMS), which is a unidirectional point-to-multipoint bearer service in which data is transmitted from a single source entity to multiple recipients. The MBMS has two modes of operation: a broadcast mode and a multicast mode. When using MBMS, data is transmitted over a common radio channel in order to efficiently use radio/network resources. In the broadcast mode the data is transmitted to all users in one or more broadcast areas, whereas in the multicast mode the data is transmitted to a multicast group in a multicast area. The multicast group is a group of users who have activated the service in the multicast mode and are therefore capable of receiving the data.

In the on-going standardization process of studying the architecture of the Multimedia Broadcast/Multicast Service, one of the main problems is how to initiate the service efficiently, without wasting network resources. In the 3GPP specification TS 23.846, for example, it is required that "in the multicast mode, MBMS should support multicast resource allocation whereby data transmission to a multicast group is carried out in a certain cell only if multicast group members are to be found in that cell". However, a problem related to this is that the current cell of a mobile station that has joined a multicast group is not always known, i.e. if the mobile station is in a state where its current cell is unknown to the network.

The standardization process has brought about several proposals for initiating multicast data transfer and establishing a radio access bearer for the service. Some of the proposals suggest the use of traditional paging to find out the current cells of the mobile stations which have joined the multicast group. However, traditional paging mechanisms are not preferred in finding out the whereabouts of the mobile stations, since paging may cause a plurality of mobile stations to reply simultaneously or within a short period, which in turn may cause congestion on the uplink signaling channel.

Version 1.1.1 of the above-mentioned specification TS 23.846 suggests that in a multicast case, the SGSN (Serving GPRS Support Node) sets up the radio resources on a Routing Area basis, i.e. for the Routing Areas where members of the multicast group have been detected. Thus in this case the mobile stations are not required to perform any uplink signaling in order to indicate their presence and/or willingness to receive the service, but the radio resources are set up immediately in the above-described manner. However, a major drawback of this method is that it wastes network resources, since the resources are set up for all RNCs (Radio Network Controllers) serving the Routing Area, even though there would be no MBMS capable users under the RNC's coverage area.

It is an objective of the invention to bring about a solution whereby it is possible to avoid the above-mentioned drawbacks.

SUMMARY OF THE INVENTION

The objective of the invention is to accomplish a mechanism whereby a multicast service can be provided in a cellular network so that the resources allocated for the service correspond to the real need in the network and so that excessive signaling on the uplink channels can be avoided in the start-up phase of the service. These and other objectives of the invention are accomplished in accordance with the principles of the present invention by providing a multicast transmission scheme which utilizes service notifications sent to the members of the multicast group in order to inform them of an upcoming multicast session. Upon receiving the service notification, a mobile station belonging to the multicast group determines the moment for sending a response to the notification. The response moments of the mobile stations can be spread over a certain period so that only one or a few of said mobile stations give an immediate response to the network. Radio resources are established in cells when the responses received meet desired criteria, and the service is delivered through the resources established.

Thus one aspect of the invention is providing a method for performing multicast transmission in a cellular network which includes mobile stations, the method comprising the steps of transmitting a multicast service notification to a certain multicast group, said notification to inform of an upcoming multicast session, receiving the multicast service notification in mobile stations belonging to said multicast group, in response to said receiving step, selecting a moment for a response to said multicast service notification in said mobile stations, sending a presence report from at least one of said mobile stations at the response moment of said at least one mobile station, receiving the presence report(s) in a radio access network, setting up radio resources for multicast transmission in a cell of the cellular network, when the presence report(s) received in said cell meet(s) predetermined criteria, and transmitting the multicast data using the radio resources set up for the multicast transmission.

Another aspect of the invention is that of providing a system for performing multicast transmission in a cellular network, the system comprising a radio access network adapted to transmit a multicast service notification to mobile stations belonging to a multicast group, in said mobile stations, first means for selecting a moment for a response to said multicast service notification and for sending a presence report to the radio access network when the response moment arrives, whereby the radio access network is adapted to receive the presence reports, second means for establishing radio resources for the multicast transmission in individual cells of the cellular network, the second means being adapted to establish the radio resources for a cell when the presence report(s) received in the cell meet(s) predetermined criteria.

In a further aspect the invention provides a mobile station for a cellular network, the mobile station comprising
   reception means for receiving a multicast service notification informing of an upcoming multicast session,
   response means for selecting a moment for a response to said multicast service notification and for sending a presence report at the response moment, the presence report indicating the willingness of the mobile station to receive the multicast service,
whereby the reception means are adapted to receive a notification informing of a presence report sent by another mobile station.

The invention provides a mechanism which enables the network to be aware of whether there are any recipients of a multicast service in a particular cell of a cellular network. The mechanism therefore also enables resource allocation only in cells containing a required amount of recipients for the service, i.e. allocation of resources can be avoided in cells with too few or no recipients at all.

Furthermore, the mechanism according to the invention prevents the uplink signaling channels from becoming congested, even if a lot of mobile stations within the same cell are awaiting the same multicast service and many of these are in a state, such as an idle state, which normally requires signaling with the network prior to any other actions. Congestion can thereby be avoided, since a major number of the mobile stations can immediately change over to a reception mode when the service is about to start, without a need to signal in the uplink direction.

Other features and advantages of the invention will become apparent by reference to the following detailed description and accompanying drawings.

BRIEF DESCRIPTION OF THE DRAWINGS

In the following, the invention and its preferred embodiments are described more closely with reference to the examples shown in FIG. 1 to 4 in the appended drawings, wherein.

DETAILED DESCRIPTION OF THE INVENTION

Below, the invention and its preferred embodiments are described using the terms and concepts commonly used in association with a UMTS environment. However, it is to be noted that the present invention is not tied to a particular technology, such as UMTS, but can be applied to any radio access network where multicast services are provided.

Figure 1:
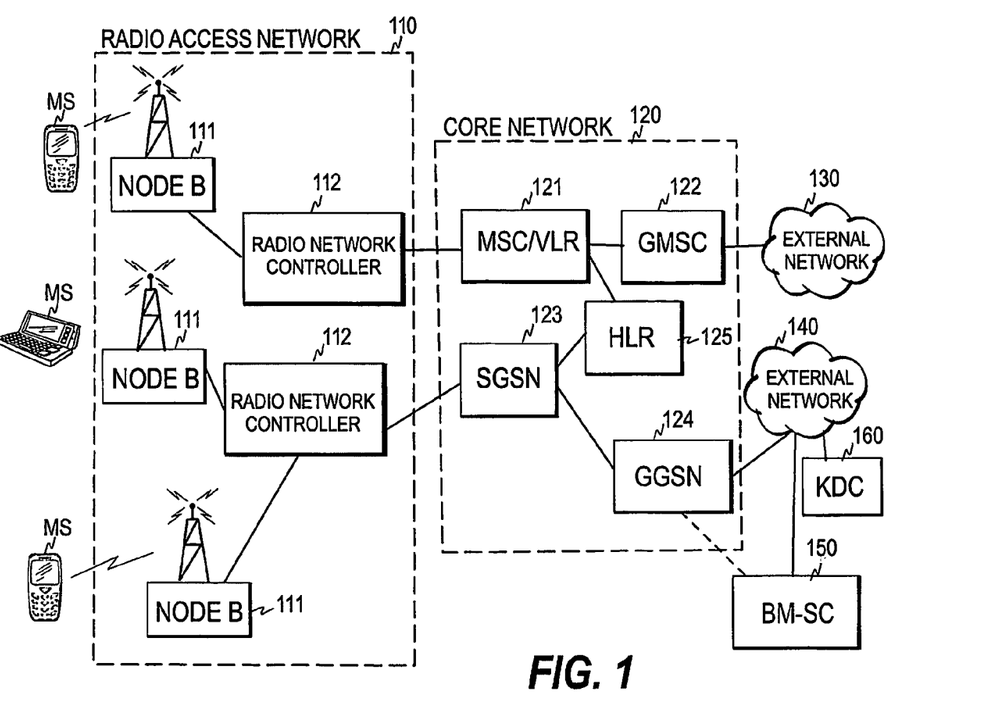
FIG. 1 illustrates network architecture to which the present invention can be applied.

FIG. 1 illustrates a general UMTS (Universal Mobile Telecommunication System) architecture to which the present invention can be applied. As is commonly known, a UMTS network consists of three interacting domains: User Equipment (UE), Radio Access Network (RAN), and a Core Network (CN). In the figure, the Core Network is denoted by reference numeral 120, the Radio Access Network (such as UTRAN, Universal Mobile Telecommunication System Terrestial Radio Access Network) by reference numeral 110, and the User Equipment is shown as a plurality of mobile stations MS. In this context, the term "mobile station" refers to any terminal device (mobile equipment plus a subscriber identity module) which the user can control and which can communicate with the Radio Access Network. The mobile stations are connected via the Uu radio interface to node B elements 111, which are the physical units for radio transmission/reception in the cellular network. Depending on the sectoring of its antennas, a node B can serve one or more cells. In addition to the node B elements, the Radio Access Network further comprises Radio Network Controllers (RNC) 112, each of which is connected through the Iub interface to a set of node B elements. Each Radio Network Controller is responsible for the control of the radio resources within its domain, i.e. in the set of node B elements connected to it. The Radio Network Controllers 112 form the service access points for the services the RAN provides to the Core Network 120.

The Core Network is divided into circuit-switched and packet-switched domains, the former being responsible for the traditional circuit-switched services and the latter for packet-switched services. The circuit-switched domain is connected via a Mobile services Switching Centre (MSC) 121 and the packet-switched domain via a Serving GPRS Support Node (SGSN) 123 to the Radio Access Network.

The MSC comprises a Visitor Location Register (VLR), which is a database holding a copy of a visiting user's service profile and information on the location of the mobile station. The MSC/VLR is connected through a Gateway MSC 122 to external circuit-switched networks 130, such as Public Switched Telephone Networks (PSTNs).

The SGSN is connected to a Gateway GPRS Support Node (GGSN) 124, which connects the Core Network to external packet-switched networks 140, such as the Internet. The SGSN and the GGSN have functionalities similar to those of the MSC/VLR and GMSC, respectively, but in relation to packet-switched services. Some network elements of the Core Network, such as the Home Location Register (HLR) 125, are shared by both domains.

A further network element belonging to the system of the invention is the source of the multicast service data to be transmitted to the mobile stations that have joined the multicast service group. The multicast data source can be the Broadcast Multicast—Service Centre (BM-SC) 150 or some other entity internal or external to the UMTS system. Internal data sources may provide their data directly, while data delivery from external sources is controlled by Border Gateways (BG), which may allow, for example, data from single addresses and ports to pass into the PLMN for delivery by an MBMS service.

Depending on the security features implemented in it, the system according to the invention may further utilize the services of a Key Distribution Center (KDC) 160, as described later.

Figure 2:
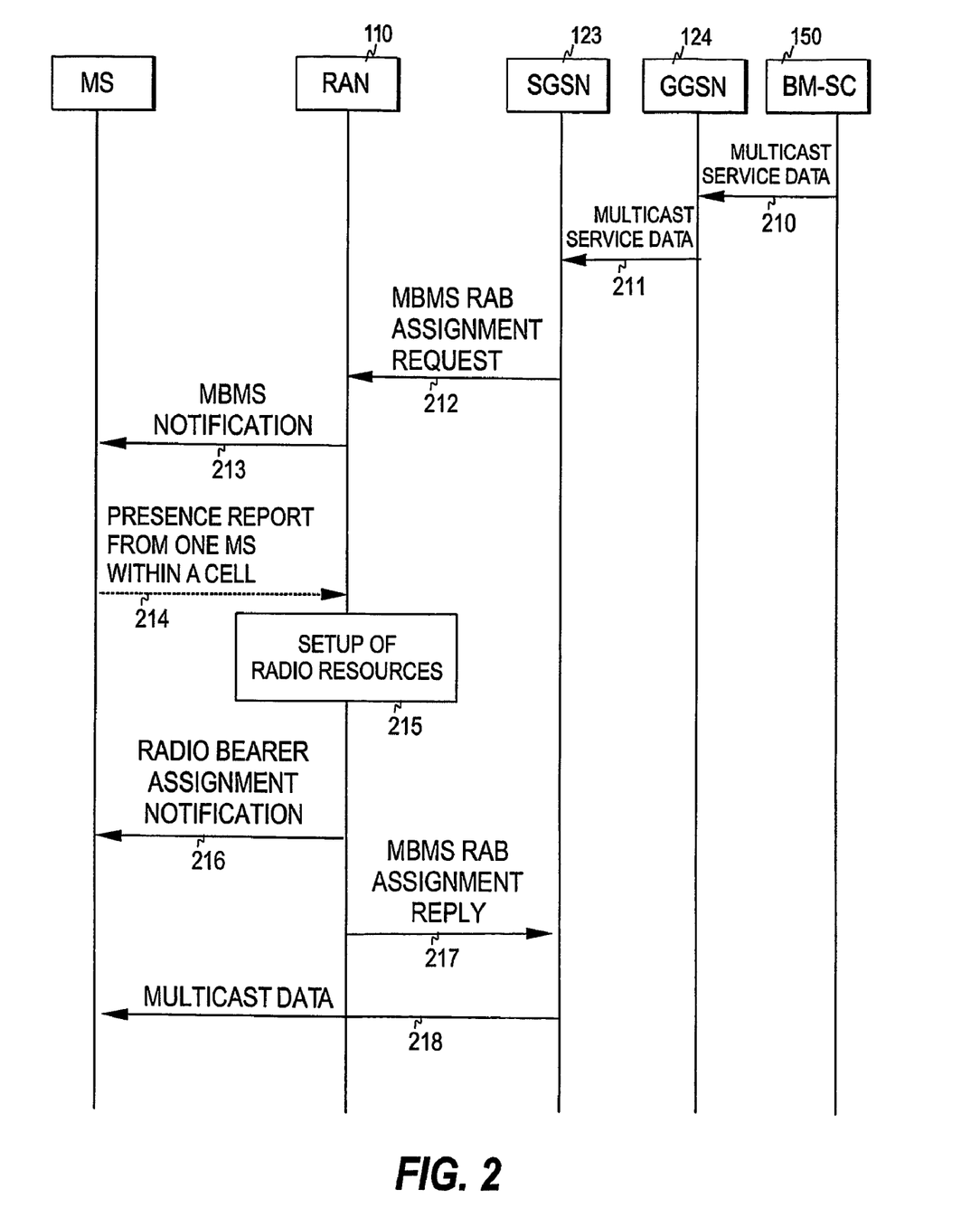
FIG. 2 illustrates an example of message transfer between the elements of the system of FIG. 1.

FIG. 2 is a diagram illustrating the procedure according to one embodiment of the present invention for initiating data transfer and RAB (Radio Access Bearer) establishment for the multicast service. It is assumed here that the two preceding phases related to a multicast service provision, i.e. the registration phase and the joining phase, have been performed in advance, and that the MBMS context has been stored in the network. In the registration phase, the users who possess the mobile stations agree with the service provider or operator on the conditions regarding the provision of the multicast service. In a subsequent joining phase the users indicate willingness or readiness to receive the multicast service. As a result of these two phases, an MBMS context is defined and stored in the network. The MBMS context here refers to an information entity including data required for the provision of the multicast service, such as address and subscriber information. An MBMS context can be service-specific or there can be a context for each subscriber of a service, for example. Below, the users who have performed the above two phases are termed members of the multicast group.

When the service session is about to begin, the BM-SC first sends the MBMS data, i.e. the actual service data, to at least one GGSN (step 210). Each receiving GGSN then sends the data to all the bearers (e.g. Gn/Gp GTP tunnels) which have been established between the GGSN and the relevant SGSNs for this multicast address (step 211). Thus in terms of the present invention, the GGSN only has routing functionality. The SGSNs buffer the multicast data.

In order to establish radio resources for the multicast transmission, each SGSN receiving the multicast data initiates an establishment process by sending an MBMS RAB assignment request (step 212) to the RNCs controlling the Routing Areas (RA) where there are mobile stations which have joined the multicast service group, i.e. which have joined the MBMS context. The MBMS RAB assignment request indicates the QoS parameters, for example. In the UMTS, a mobile station is tracked by the SGSN on the Routing Area level if no RRC connection has been established for the mobile, whereas the UTRAN tracks the mobile on the cell level when the RRC connection has been established.

In the basic embodiment of the invention, each of the RNCs receiving the MBMS RAB assignment request then sends an MBMS notification to all cells controlled by the RNC (step 213), notifying the mobile stations of incoming multicast data. A second embodiment, where the sending of the MBMS notification can be omitted in some of the cells, is discussed below after the basic embodiment has been examined.

The MBMS notification contains a membership query inquiring whether there are any recipients for the multicast data in the cell, i.e. any subscribers that have joined the multicast group and are thus members of the group.

When a mobile station receives this notification, it initiates a response process if it is a member of the group. In this process, the mobile station defines a moment for its response to the membership query. This is preferably implemented so that the mobile station sets a delay timer to a value which is specific to each of the mobile stations. In this case the above-mentioned membership query preferably includes a value for the maximum response delay and each mobile station selects a random value between zero and the said maximum response delay. In this way the response moments of the mobile stations are spread randomly over a period whose length corresponds to said maximum delay.

When the first timer expires and the relevant RNC receives the first response to the membership query (step 214), the said RNC can either initiate the setting up of radio resources immediately or it can wait for more responses to arrive. When the response(s) received within an individual cell meet(s) certain predetermined criteria, the RNC initiates the setting up of radio resources for that cell. As a result of this set-up procedure (step 215), appropriate radio bearers are established for the multicast service. Here the responses are also termed presence or membership reports, since they indicate that a member is present in the cell.

When the radio resources have been set up, the relevant RNCs send a radio bearer assignment notification to the mobile stations (step 216), informing them about the radio parameters for receiving the service. This sending takes place within the cells for which radio resources have been set up. If a mobile station belonging to the multicast group receives this notification before its delay timer expires, it stops the timer and cancels the transmission of the presence report in order to suppress the number of responses sent to the network. Thus a mobile station sends the presence report only if its delay timer expires before it receives the radio bearer assignment notification from the network or a report from another mobile station indicating that no further responses are needed.

In order to enable the mobile stations entering a cell to detect the upcoming multicast session, MBMS notification is preferably sent periodically until the maximum response time has expired. In the repeated MBMS notification, the value of the maximum response time is updated (i.e. decreased) accordingly.

In response to the setting up of the radio resources, the RNC also sends a reply (step 217) to the request received from the SGSN at step 212, the reply indicating the SGSN that the radio access bearer has established successfully. In response to said reply, the multicast data is transmitted from the SGSN to the mobile stations (step 218).

During the service session, the MBMS notification and the radio bearer assignment notification are preferably transmitted periodically in order for mobile stations which enter the cell to detect the on-going session. The two messages can be transmitted successively as separate messages, or they can be combined into a single message.

In the above-described scheme the moment for the response to the membership query is determined by setting a timer to a random value between zero and the maximum delay value. The idea here is to determine a member-specific response moment for each group member present in the cell. The response moment can be determined in many different ways. Instead of setting a timer to a random value, each mobile station can, for example, calculate its response moment by means of an algorithm having at least one input specific to each mobile station. Such a calculation can be based on the International Mobile Subscriber Identity (IMSI) and the current frame number, for example. As the majority of the mobile stations cancel the sending of the report before the response moment arrives, uplink congestion can be avoided.

The above-described scheme can be modified at various steps described above. As already mentioned briefly, according to one embodiment of the invention the sending of the MBMS notifications can be omitted for at least some of the cells. A prerequisite for this is that the network knows the current cells and states of at least some members of the multicast group so that it can immediately identify the cells containing enough members capable of receiving the service data. In this case the RNCs can communicate with the SGSN or another network element holding the Mobility Management (MM) context which includes the locations on a cell level. Alternatively, the SGSN can send this information in the RAB assignment request to the relevant RNCs. In UMTS, the serving RNCs perform the cell tracking, whereby they know upon receiving the RAB assignment request whether the sending of the MBMS notification can be omitted in any of the cells.

When the network knows that some of the cells contain enough multicast group members in the appropriate state(s) for receiving the service directly, a point-to-multipoint bearer can be set up for the service delivery and the process can jump from step 212 directly to step 214 with respect to these cells. Thus in this embodiment of the invention no membership queries are transmitted in these cells, but the radio bearer assignment notification is the first notification to the mobile stations indicating that a multicast service session is to be started. Thus the radio bearer assignment notification has a twofold meaning for the mobile stations. On the one hand, if there has been a prior multicast service notification, the mobile station stops the delay timer from running and cancels the sending of the membership report. On the other hand, a radio bearer assignment notification without a preceding multicast service notification indicates that the multicast transmission is about to begin, whereby no more signaling to the RAN is needed. Thus in the latter case a mobile station does not have to activate the transmitter part of the device.

The method for finding out the relevant RNCs and the relevant cells can vary depending on the nature of the service, such as the geographical coverage of the service, and on the contents of the MM and/or MBMS contexts stored in the network. In regard to service which is geographically wide, for example, the location of each subscriber can be stored in the MBMS context in connection with the joining phase, and the location can be tracked thereafter, whereby the locations of the subscribers, and also the relevant RNCs, are known when the service data arrives. Thus the method of the invention can include additional steps for updating the MM and/or MBMS contexts stored in the network, or the method can rely on the contexts already available in the network.

The terminating of the response procedure can also be triggered by a message other than the radio bearer assignment notification. For example, the RNCs can echo the first presence report to all mobile stations in the same cell so that they can terminate the response procedure. In some networks, it can also be possible for mobile stations to receive directly the presence report sent on the uplink by a mobile station in the same cell. A separate terminating message can also be sent to the mobile stations before the establishment of the radio resources.

Furthermore, different threshold criteria can be used for the setting up of the radio resources. For example, the number of reports required per cell may change, or the criteria can depend on the subscribers in the cell.

The maximum value of the response time may also be known to the mobile station in advance, so that it does not have to be inserted in the membership query. However, if the value is inserted in the membership query, the operator can control the number of the mobile stations replying to the query. For example, if the maximum value is set to zero, all the mobile stations will automatically send a reply. The operator may wish to do this for charging purposes, for example.

Not every step from 210 to 218 shown in connection with FIG. 2 is necessarily comprised of only one message, but can comprise a process which includes more than one message between the relevant parties.

Figure 3:
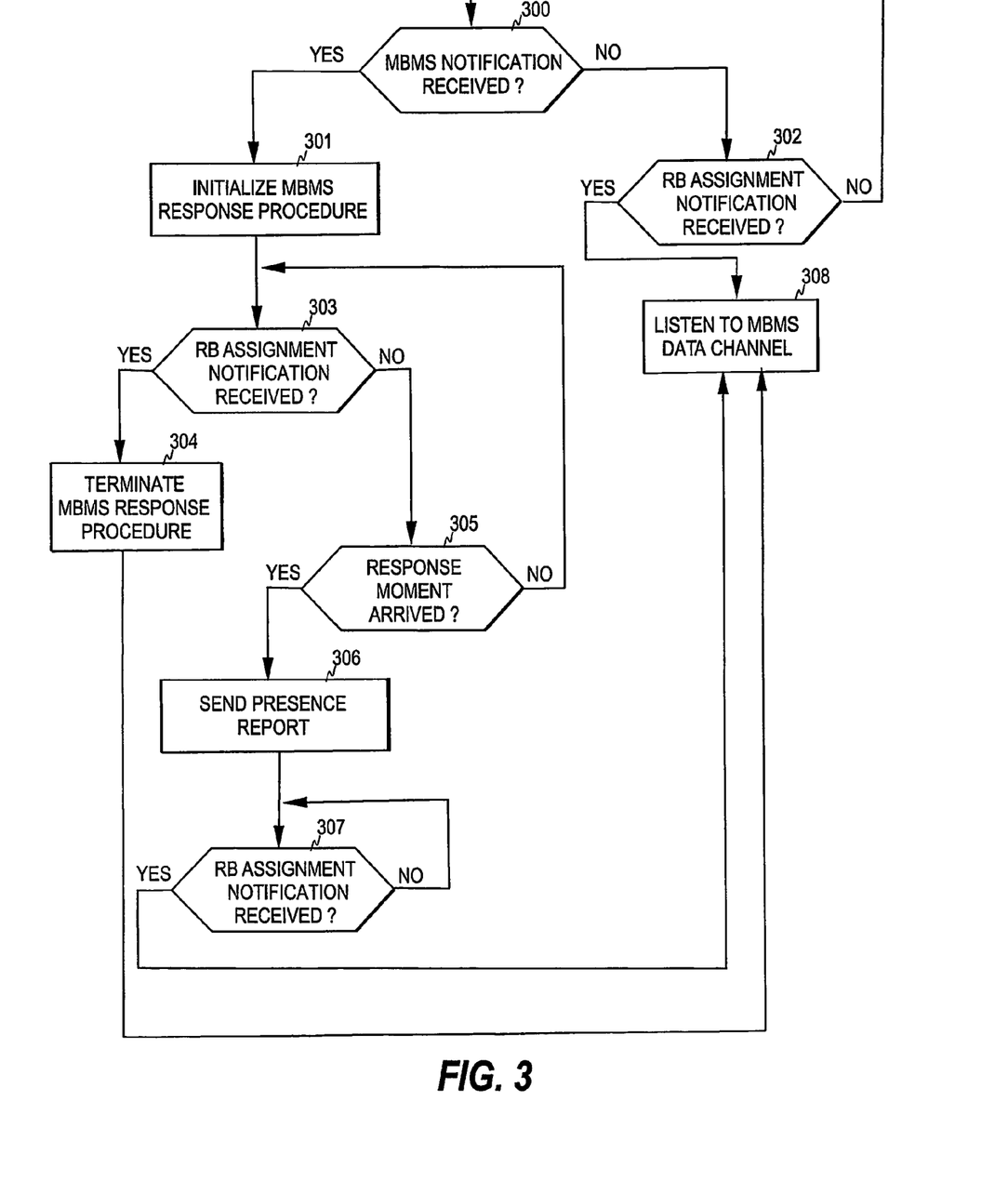
FIG. 3 is a flow diagram illustrating the basic operation of a mobile station according to the invention.

FIG. 3 is a flow diagram illustrating the basic operation of a mobile station belonging to the multicast group. As mentioned above, the two messages giving prior indication of an upcoming multicast session are the MBMS notification and the radio bearer assignment notification, whereby the mobile station constantly monitors whether one of them has arrived (steps 300 and 302).

If the mobile station receives the MBMS notification, it initializes the MBMS response procedure (step 301), i.e. determines the moment for its membership report, and waits for a possible radio bearer assignment notification and for the response moment to arrive (steps 303 and 305). If the radio bearer assignment notification arrives before the response moment, the mobile station terminates the MBMS response procedure, i.e. cancels the sending of the membership report (step 304). If no radio bearer assignment notification arrives before the response moment, the mobile station sends its group membership report to the network (step 306) and waits for the radio bearer assignment notification to arrive (step 307). When this notification arrives, the mobile station changes to the multicast reception mode, where it listens to the MBMS data channel in order to receive the service data (step 308) transmitted on that channel.

If the mobile station receives the radio bearer assignment notification as the first indication of the upcoming multicast session (step 302/yes), it changes immediately to the multicast reception mode in order to receive the service data on the MBMS data channel.

Due to mobility, the number of users in a cell changes constantly. As a result of this, a cell may become void of group members. In order to prevent service transmission in such a cell, the radio access network may perform a membership query periodically during an on-going service session (e.g. when there are no members in the PMM-connected mode in the cell). An alternative solution to this is that the mobile stations currently receiving multicast session data must perform cell updates.

Furthermore, the mobile station which was the last to report its presence in a cell can be given the status of a flag-holder, so that if that mobile station moves out of the cell and reports this (e.g. by explicitly reporting a "cell leave" or by performing a cell update in a new cell), a check whether there are still other mobile stations remaining in the old cell can be initiated immediately. In an alternative embodiment, every mobile station reporting its presence can be made a flag-holder, and the total number of flag-holders must drop below a predetermined number before a new check is performed. In a further alternative embodiment, the flag-holder's "cell leave" is forwarded to the other members in the cell, thereby prompting them to report their status.

Due to delays in the network, it may happen that more than one mobile station sends its membership report before the RAN finds time to respond to the first report. In this case, multiple mobile stations can be set as "flag-holders", or just one of the said mobile stations is given this status.

In one preferred embodiment of the invention, the RAN verifies that the users in a cell are authorized to receive the service data, thereby preventing accidental or intentional misuse of the network resources. If this verification indicates that none of the members in a cell is authorized to receive the service data, no network resources within that cell need to be allocated for service delivery.

There are several known authentication techniques that can be used at steps 213 and 214 above to check whether a mobile station is authorized to receive a particular multicast service. The user's authorization can be verified through group authentication, i.e. by finding out whether a message was sent by one of the members of an authorized group, or through a source authentication, i.e. by checking if a message was sent by a particular member of an authorized group.

Alternative techniques that support both group authentication and source authentication are the use of message authentication codes and digital signatures. The latter technique can be further improved by the use of digital certificates. The use of message authentication codes is discussed first.

As is commonly known, a Message Authentication Code (MAC) can be included in a message to provide authenticity without secrecy. The MAC is a value derived from the message by a key-dependent one-way function (such as the widely used HMAC). Only the party possessing the key can create or verify the MAC.

As to the present invention, the key can be shared either by all mobile stations authorized to access a particular multicast group (group authentication), or a different key can be assigned to each authorized mobile station (source authentication). In either case, both the mobile station and the RNC must have the same MAC key. Consequently, there is a need for a Key Distribution Center (KDC) which creates the MAC keys and delivers them securely (with authentication and secrecy) to the authorized mobile stations. The RNC also needs to request the MAC keys from the KDC, unless the keys are configured in the RNC in advance.

Just like MACs, digital signatures are used for providing authenticity without secrecy. However, a different key is used for signing the messages and verifying the signatures. A digital signature mechanism is typically implemented using public-key cryptography, utilizing the widely used RSA algorithm, for example.

In the present invention, either a different signing key can be provided for each authorized mobile station (source authentication) or the same signing key can be shared by all authorized mobile stations (group authentication). Similarly as in the case of the MAC keys, a secure delivery mechanism is needed for delivering the signing keys from the KDC to the mobile stations, and the RNC needs to be provided with the signature verification keys.

A digital certificate contains a public key, signed by a trusted third party usually known as the Certificate Authority (CA). Other information such as the validity period of the certificate is normally included and also protected by the signature.

As mentioned above, digital certificates can be used to improve the digital signature method described above. The mobile station first obtains a signing key and a certificate containing the corresponding signature verification key from a KDC. The KDC can be a network element internal (cf. FIG. 1) or external to the UMTS system. For example, an external KDC could be located at the content provider sending the multicast service data via the Internet, while an internal KDC could be co-located with the BM-SC. If the KDC exists within a UMTS system, it can be implemented either as a separate entity or as an element co-located at another UMTS network element. Even the security functionality of an existing UMTS network element, such as SGSN, can possibly be re-used for MBMS key generation and distribution.

When the mobile station replies to a multicast session notification, it signs the response and includes with it the certificate containing the signature verification key. Using the certificates, there is no need for the RNC to communicate with a KDC to verify if a mobile station is authorized to access a particular multicast group.

In order to be able to verify the signatures of the mobile stations, the RNC has to be provided with a signature verification key of one or more trusted CAs. In case more than one CA is used, their signature keys can either be configured separately to the RNC or certificate hierarchy can be utilized. For certificate hierarchy, just a single signature verification key of a top-level CA needs to be configured to the RNC: This key is then used to authenticate the certificates of lower-level CAs, each containing the signature verification key of that CA. With the hierarchical certificates, a mobile station has to include the certificate of a lower-level CA with each membership report.

In order to protect the system against replay attacks, where an attacker records valid group membership query/response messages and re-sends them at a later time, these messages can include information revealing such an attack. A suitable information field can carry a random number, a time stamp, or some other "number used once" (i.e. nonce). For example, the RNC could include a nonce in the group membership query as a challenge to the mobile station. The mobile station would then have to include the same value of the nonce in its response, protected by a signature or a MAC.

Figure 4:
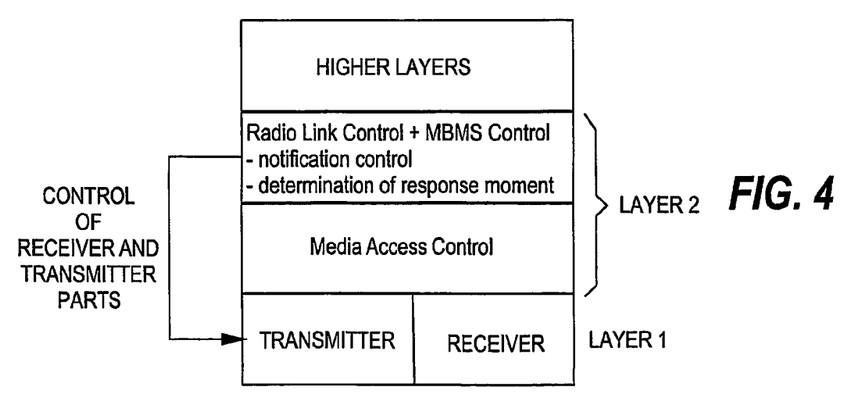
FIG. 4 is a schematic presentation of a mobile station according to the invention.

FIG. 4 illustrates the insertion of the MBMS functionalities according to the invention into the architecture of a mobile station. These MBMS functionalities, such as notification control and determination of the response moment, are preferably inserted in the RLC (Radio Link Control) layer (layer 2) of the device. These functionalities communicate with layer 1 (physical layer) in order to set the transmitter and receiver parts of the device to an appropriate state. One of the advantages of the invention is that the mobile station can immediately move to a reception state upon detecting a notification indicating that another mobile has already replied to the membership query. Thus the transmitter part can be maintained in an idle mode, as no signaling in the uplink direction is needed. In this way both the power consumption of the mobile and the uplink traffic can be kept low.

Although the invention was described above with reference to the examples shown in the appended drawings, it is obvious that the invention is not limited to these, but may be modified by those skilled in the art without departing from the scope and spirit of the invention. For example, the mobile stations do not necessarily need to stop their timers when the radio allocation is detected, instead they can report their status at random moments so that the network can detect their presence without the necessity that all reports arrive at the same time.

The invention claimed is:

1. A method, comprising:
   transmitting a multicast service notification to a certain multicast group, wherein said notification configured to inform of an upcoming multicast session;
   receiving the multicast service notification in mobile stations belonging to said multicast group;
   in response to said receiving the multicast service notification, selecting a moment for a response to said multicast service notification in said mobile stations;
   sending a presence report from at least one of said mobile stations at the response moment of said at least one mobile station;
   receiving a presence report in a radio access network;
   setting up radio resources for multicast transmission in a cell of a cellular network, when the presence report received in said cell meets a predetermined criteria; and
   transmitting the multicast data using the radio resources set up for the multicast transmission,
   wherein the cellular network comprises mobile stations.

2. A method according to claim 1, wherein the response moment is specific to each of said mobile stations within a certain upcoming time period.

3. A method according to claim 2, further comprising:
   informing at least some of said mobile stations of the presence report received in the radio access network; and
   in response to said informing, canceling the sending of the presence report in a mobile station waiting for its response moment to arrive.

4. A method according to claim 3, wherein said informing further comprises sending a radio bearer assignment notification to said mobile stations in response to the setting up the radio resources.

5. A method according to claim 2, wherein the selecting the moment for the response comprises selecting a random response moment within said certain upcoming time period.

6. A method according to claim 5, further comprising:
sending information on a length of the certain upcoming time period in the multicast service notification.

7. A method according to claim 2, wherein the transmitting of the multicast service notification comprises transmitting said notification periodically during said certain upcoming time period.

8. A method according to claim 7, further comprising:
updating a length of the certain upcoming time period for periodically transmitted notifications.

9. A method according to claim 1, further comprising:
checking locations of said mobile stations in the cellular network.

10. A method according to claim 9, wherein each of the locations are checked at a routing area, wherein an identity of each routing area is obtained where a mobile station is located.

11. A method according to claim 10, wherein the transmitting of the multicast service notification comprises transmitting said notification to all cells in the routing areas where the mobile stations are located.

12. A method according to claim 10, further comprising:
checking the locations of at least some of said mobile stations at a cell level, whereby a set of cells are obtained comprising mobile stations belonging to the multicast group.

13. A method according to claim 12, wherein the transmitting of the multicast service notification comprises transmitting said notification within all cells in the routing areas where the mobile stations are located, except within said set of cells.

14. A method according to claim 1, wherein the setting up of the radio resources is performed for a cell when the number of presence reports received from the cell reaches a predetermined limit.

15. A method according to claim 14, wherein said predetermined limit is one.

16. A method according to claim 1, further comprising:
monitoring a number of members of the multicast group in a cell during the upcoming multicast session.

17. A method according to claim 1, further comprising:
authenticating at least one of the mobile stations prior to the transmitting of the multicast data.

18. A method according to claim 17, wherein the authenticating the at least one of the mobile stations comprises inserting a challenge in the multicast service notification, and returning a response in the presence report.

19. A system, comprising:
a radio access network configured to transmit a multicast service notification to mobile stations belonging to a multicast group;
in said mobile stations, a selector configured to select a moment for a response to said multicast service notification and further configured to send a presence report to the radio access network when the response moment arrives, wherein the radio access network is further configured to receive the presence reports; and
a processor configured to establish radio resources for the multicast transmission in individual cells of a cellular network, wherein the processor is configured to establish the radio resources for a cell when the presence report received in the cell meets a predetermined criteria.

20. A system according to claim 19, wherein the processor is further configured to establish the radio resources for a cell when the number of presence reports received from the cell reaches a predetermined limit.

21. A system according to claim 20, wherein said limit is one.

22. A system according to claim 20, wherein said mobile stations are further configured to cancel the sending of the presence report in response to the reception of a predetermined message.

23. A system according to claim 22, wherein at least one of the mobile stations is configured to cancel the sending of the presence report in response to receiving a presence report sent by another mobile station.

24. A system according to claim 22, wherein the predetermined message indicates that the radio resources have been established.

25. A system according to claim 19, wherein said selector is further configured to select a random moment from within a given time period.

26. A system according to claim 19, wherein the system further comprises an authenticator configured to authenticate the mobile stations.

27. An apparatus, comprising:
a receiver configured to receive a multicast service notification informing of an upcoming multicast session; and
a processor configured to select a moment for a response to said multicast service notification and further configured to send a presence report at the response moment;
wherein the presence report indicates the willingness of the apparatus to receive the multicast service, and
wherein the receiver is further configured to receive a notification informing of a presence report sent by another apparatus.

28. An apparatus according to claim 27, wherein the processor is further configured to cancel the sending of the presence report in response to the notification informing of a presence report sent by the another apparatus.

29. An apparatus according to claim 27, wherein the processor comprises a timer configured to expire at the response moment.

30. A system, comprising:
a radio access network configured to transmit a multicast service notification to mobile stations belonging to a multicast group,
in said mobile stations, first processing means for selecting a moment for a response to said multicast service notification and for sending a presence report to the radio access network when the response moment arrives, whereby the radio access network is configured to receive the presence reports,
second processing means for establishing radio resources for the multicast transmission in individual cells of the cellular network, the second processing means for establishing the radio resources for a cell when the presence report(s) received in the cell meet(s) predetermined criteria.

31. An apparatus, comprising:
reception means for receiving a multicast service notification informing of an upcoming multicast session; and
response means for selecting a moment for a response to said multicast service notification and for sending a presence report at the response moment,
wherein the presence report indicates the willingness of the apparatus to receive the multicast service, and wherein the reception means are further for receiving a notification informing of a presence report sent by another apparatus.

32. A method, comprising:
receiving a multicast service notification informing of an upcoming multicast session;
selecting a moment for a response to said multicast service notification and further configured to send a presence report at the response moment; and
receiving a notification informing of a presence report sent by another apparatus,
wherein the presence report indicates the willingness of the apparatus to receive the multicast service.

33. An apparatus according to claim 32, further comprising:
canceling the sending of the presence report in response to the notification informing of a presence report sent by the another apparatus.

34. An apparatus according to claim 32, further comprising:
terminating a timer at the response moment.

* * * * *